United States Patent [19]

Van Den Boogaart et al.

[11] 3,856,836
[45] Dec. 24, 1974

[54] METHOD FOR MANUFACTURING A STABILIZED MANGANESE ETHYLENEBISDITHIOCARBAMATE PRODUCT AND METHOD FOR MANUFACTURING FUNGICIDAL PREPARATIONS CONTAINING SUCH STABILIZED PRODUCT

[75] Inventors: Krijn Van Den Boogaart; Meelis Nicolaus Louis, both of Vlaardingen, Netherlands

[73] Assignee: Pennwalt Corporation, Philadelphia, Pa.

[22] Filed: July 16, 1973

[21] Appl. No.: 379,693

[30] Foreign Application Priority Data
July 18, 1972 Netherlands................. 72/09913

[52] U.S. Cl............. 260/429 K, 252/401, 252/405, 424/286, 424/287
[51] Int. Cl. ........................................... C07f 13/00
[58] Field of Search......... 260/429 K; 424/144, 287, 424/286

[56] References Cited
UNITED STATES PATENTS

| | | | |
|---|---|---|---|
| 2,974,156 | 3/1961 | Sobatski........................... | 260/429 K |
| 3,173,832 | 3/1965 | Harris .............................. | 260/429 K |
| 3,436,456 | 4/1969 | Louis et al. ...................... | 260/429 K |
| 3,436,457 | 4/1969 | Louis et al. ...................... | 260/429 K |
| 3,449,386 | 6/1969 | Chiffert............................ | 260/429 K |

*Primary Examiner*—Daniel E. Wyman
*Assistant Examiner*—A. P. Demers

[57] ABSTRACT

A stable, more fungicidally effective maneb composition (manganese ethylenebisdithiocarbamate) is produced by contacting with aqueous formaldehyde the reaction product in aqueous medium of a water-soluble salt of ethylene bisdithiocarbamic acid and a water-soluble manganese salt.

8 Claims, No Drawings

METHOD FOR MANUFACTURING A STABILIZED MANGANESE ETHYLENEBISDITHIOCARBAMATE PRODUCT AND METHOD FOR MANUFACTURING FUNGICIDAL PREPARATIONS CONTAINING SUCH STABILIZED PRODUCT

The present invention relates to a method for the manufacture of a stabilized manganese ethylenebisdithiocarbamate (here after to be called maneb) product and to a method for the manufacture of fungicidal preparations which contain such stabilized maneb product.

It is well known that most metal salts of alkylene bisdithiocarbamic acids are unstable at elevated temperatures, which instability manifests itself — among other things — by the liberation of carbon disulphide. Also in the case of storage over long periods this phenomenon becomes apparent, especially in the presence of moisture and a sufficient concentration of oxygen or air.

Maneb shows these disadvantages in stronger measure than, e.g., the corresponding zinc salt. It is well known that maneb may take fire spontaneously during manufacture, especially during drying and milling. Other signs of decomposition have been found such as discoloration or carbonisation especially during storage in the presence of moisture and/or a sufficient amount of oxygen (air). Especially at high temperatures when there is insufficient removal of the heat of decomposition self ignition may occur.

Various stabilizing agents for maneb have been proposed. In U.S. Pat. No. 2,665,285 the use of organic sulphites of sodiun or calcium is recommended. In this case hermetic storage is required.

In Federal German Pat. No. 1,113,607 is described the use of hexamethylene tetramine, which is also active in the presence of air. In Netherlands Pat. No. 288,639 mixtures of various metal salts of propylene bisdithiocarbamic acid are described, the unstable manganese salt being stabilized by the other metal salts present.

British Pat. No. 1,119,029 relates to the application of 1,3,5,-tris (cyanomethyl) hexahydrotriazine and/or dinitroso-pentamethylene tetramine as stabilizing agent(s) and French Pat. No. 1,374,622 describes the application of o-, m- or p- phenylene diamine.

French Pat. No. 1,344,342 finally describes the application of paraformaldehyde. In the fungicidal preparation, which contains 60 – 95 percent of active material, paraformaldehyde is included to the amount of 0.2 – 5 weight percent, either by dry mixing of the components or by washing a sample of active product with an aqueous paraformaldehyde solution.

It has now been discovered that an excellently stabilized maneb product with outstanding fungicidal activity is obtained when to the reaction mixture — which has been obtained by mixing an aqueous solution of a water soluble manganese salt and an aqueous solution of water salt of ethylene bisdithiocarbamic acid, upon which maneb precipitates — is added an aqueous formaldehyde solution and the solid matter obtained is separated from the reaction mixture. The separation of the solids may be realized by filtering, centrifuging and the like. In general the solids thus obtained will be washed and dried and are then ready to be worked up in fungicidal preparations. In the preparations other stabilizing agents may be included as well.

The mixing of the aqueous solutions of a water soluble manganese salt (e.g., manganese sulphate, -chloride or -nitrate) and of the water soluble salt of ethylene bisdithiocarbamic acid (e.g., an alkali metal salt, especially the sodium or the ammonium salt) is realized by methods generally known which have been described in detail in the cited literature. It is preferred that solutions of the manganese salt and of the salt of ethylene bisdithiocarbamic acid are mixed in such amounts that per mol ethylene bisdithiocarbamic acid 0.9–1.1 mol manganese salt is present. More especially even molar quantities are being mixed.

As formaldehyde solutions are generally employed commercial products which contain 30 – 40 grams of formaldehyde per 100 ml of aqueous solution. Other formaldehyde concentrations in the solutions are possible. In most cases the applied amount of formaldehyde, calculated as 100 percent HCHO is 0.05 – 1 mol per mol maneb, whereas the amount of 0.25–0.5 mol per maneb is preferably used. If desired the solutions may contain stabilizing agents usual for formaldehyde.

The maneb products prepared according to the present invention may be worked up by known methods to fungicidal preparations, e.g., by mixing with a solid and/or a liquid carrier whether or not in the presence of one or more emulsifying, dispersing — or wetting agents.

The following examples illustrate the invention:

EXAMPLE 1

A molar solution of manganese sulphate was mixed with the same volume of a molar solution of sodium ethylenebisdithiocarbamate. After the precipitation of the maneb an aqueous solution of formaldehyde (37 g. of formaldehyde per 100 ml. of aqueous solution) was added to the reaction mixture to the amount of 0,4 mol formaldehyde per mol maneb. The solid obtained was filtered off and the precipitate was washed with water and dried.

The stability of the product obtained was compared with the stability of a similarly prepared maneb product however without the addition of formaldehyde. The products were subjected to stability tests according to two different methods:

A. 10 g. of maneb was stored during 200 hours at 90°C in air.
B. 20 g. of maneb was kept during 14 days under a pressure of 25 g/cm² at 54°C as described in the CIPAC Handbook, Vol. 1 (1970) page 951.

The contents before and after these stability tests were determined after the method described in the CIPAC Handbook, Vol 1 (1970), page 464. The following results were obtained:

|  | contents before stability test% | Fall in % A | B |
|---|---|---|---|
| Stabilized maneb | 91.2 | 10.3 | 5.2 |
| Non-stabilized maneb | 91.9 | 15.8 | 8.0 |

From these tests appears clearly that the stability of the maneb has increased considerably after treatment with formaldehyde.

EXAMPLE 2

Of maneb stabilized with formaldehyde according to example 1 and of non-stabilized maneb also prepared according to example 1 we prepared 80 percent dispersible powders with the following composition:

80 weight percent maneb stabilized or non-stabilized, calculated as 100 percent;
1 weight percent sodium dibutylnaphthalene sulphonate as wetting agent;
3 weight percent ligninesulphonate as dispersing agent.
Balance: a mixture of equal weights of ammonium sulfate and kaolin as inert carrier.

The two dispersible powders thus obtained were subjected to the stability tests as described in Example 1. The following results were obtained

|  | Contents before stability test % | Fall in % A | B |
|---|---|---|---|
| Stabilized maneb | 86.8 | 13.4 | 4.6 |
| Non-stabilized maneb | 87.5 | 19.0 | 8.3 |

It will be seen that the dispersible powder prepared from formaldehyde-treated maneb shows a much better stability than the dispersible powder containing non-stabilized maneb.

EXAMPLE 3

Three different portions of maneb were prepared according to the method described in Example 1 and each separately treated with 0,3 mol formaldehyde per mol maneb. From these portions 80 percent dispersible powders were prepared with the composition as specified in example 2. These were compared with an 80 percent dispersible powder of the composition specified in example 2 of a non-stabilized maneb prepared according to the method of Example 1. The following results were obtained:

|  | Contents before stability test % | Fall in % A | B |
|---|---|---|---|
| Stabilized maneb - 1 | 87.7 | 12.4 | 5.2 |
| Stabilized maneb - 2 | 87.1 | 11.0 | 5.3 |
| Stabilized maneb - 3 | 88.6 | 11.2 | 5.3 |
| Non-stabilized maneb | 87.5 | 20.3 | 9.1 |

The stabilizing influence of formaldehyde is apparent.

EXAMPLE 4

For the determination of the phytotoxicity of maneb stabilized with formaldehyde we prepared dispersible powders according to the method of Example 2. These dispersible powders were mixed with water to suspensions which contained respectively 8,4 and 2 weight percent of maneb (calculated as 100 percent) as active material.

With the suspensions thus prepared cress seeds (*Lepidium sativum*) was sprayed to run off. In the following table the numbers refer to the percentage of plants killed.

| Weight % of active material | 8 | 4 | 2 |
|---|---|---|---|
| Stabilized maneb | 59 | 29 | 11 |
| Non-stabilized maneb | 84 | 53 | 19 |

It will be seen that the stabilized maneb is less phytotoxic than the non-stabilized maneb.

EXAMPLE 5

After example 2 we prepared dispersible powders which we mixed with water to suspensions which contained respectively 80, 40, 20 and 10 ppm maneb (calculated as 100 percent).

With the suspensions thus prepared we sprayed young tomato plants to run-off. After drying of the plants they were infected with *Phytophtora infestans*. After 7 days the number of plants which showed signs of illness was established. In the following table the numbers refer to the percantage of ill plants.

| ppm | 80 | 40 | 20 | 10 | 0 |
|---|---|---|---|---|---|
| Stabilized maneb | 6 | 17 | 36 | 51 |  |
| Non-stabilized maneb | 17 | 34 | 53 | 63 |  |
| Untreated |  |  |  |  | 82 |

It is seen that the stabilized maneb has a greater fungicidal activity than the non-stabilized product.

EXAMPLE 6

A molar solution of manganese sulfate was mixed with an equal volume of a molar solution of sodium ethylenebisdithiocarbamate. The maneb suspension thus obtained was divided into six equal parts which were worked up to the products A – F in the following way:

A. Precipitate filtered off, washed with water and dried (blank)
B. Precipitate filtered off, washed with water and dried. The dried product was then mixed with 3 weight percent of paraformaldehyde (compare Example 1 Of French Pat. No. 1,344,342).
C. Precipitate filtered off, washed with water and dried. The dried product was then mixed with 1 weight percent of paraformaldehyde (compare Examples 1 and 2 of French Pat. No. 1,344,342).
D. Precipitate filtered off, washed with a 2 percent aqueous solution of paraformaldehyde and dried (compare Example 4 of French Pat. No. 1,344,342).
E. The maneb suspension was treated with 0.3 mol formaldehyde per mol maneb. The reaction mixture was filtered off and the precipitate washed with water and dried (Example 3).
F. The maneb suspension was treated with 0.4 mol formaldehyde per mol maneb. The reaction mixture was filtered off and the precipitate washed with water and dried (Example 1).

The preparation A – F were subjected to the stability test as described in Example 1. The results are given in the following table:

|   | Contents before test % | Fall in % | |
|---|---|---|---|
| A | 92.0 | 19.9 | 8.8 |
| B | 87.5 | 16.1 | 5.6 |
| C | 90.7 | 18.0 | 5.9 |
| D | 91.5 | 19.7 | 6.7 |
| E | 91.8 | 10.8 | 4.8 |
| F | 90.5 | 11.2 | 4.9 |

Using the products A – F we prepared dispersible powders after the method described in Example 2. The phytotoxicity of these dispersible powders on cress seeds (*Lepidium sativum*) was determined according to the method described in example 4. The results obtained are given in the following table; the numbers representing the percentage of plants killed.

| Weight % active material | 8 | 4 | 2 |
|---|---|---|---|
| A | 88 | 54 | 28 |
| B | 76 | 42 | 21 |
| C | 80 | 42 | 20 |
| D | 80 | 45 | 22 |
| E | 68 | 35 | 14 |
| F | 56 | 33 | 14 |

Of the dispersible powders thus prepared we also determined the fungicidal activity according to the method described in Example 5. In the following table the results are given, the numbers representing the percentage of ill plants

| ppm | 80 | 40 | 20 | 10 | 0 |
|---|---|---|---|---|---|
| A | 10 | 26 | 38 | 46 | |
| B | 6 | 18 | 26 | 39 | |
| C | 11 | 21 | 39 | 44 | |
| D | 9 | 26 | 39 | 46 | |
| E | 5 | 15 | 23 | 31 | |
| F | 6 | 14 | 21 | 29 | |
| Untreated | | | | | 72 |

It may be seen from the tables of this example that the chemical stability and the fungicidal activity of the products of this invention are greater than those of the products prepared in accordance with French Pat. No. 1,344,342, whereas their phytotoxicity is lower.

We claim:

1. A process for preparing a stabilized manganese ethylenebisdithiocarbamate composition which comprises admixing aqueous formaldehyde solution with precipated manganese ethylenebisdithiocarbamate solids in aqueous medium obtained by reacting an aqueous solution of a water-soluble salt of ethylene bisdithiocarbamic acid with a water-soluble manganese salt, separating the formaldehyde-treated solids from the aqueous medium, washing the solids with water, and drying the solids.

2. A process according to claim 1 wherein the proportion of formaldehyde admixed is within the range of 0.05 to 1 mole, calculated as 100% HCHO, per mole of manganese ethylenebisdithiocarbamate.

3. A process according to claim 2 wherein the formaldehyde is from 0.25 to 0.5 mole per mole of manganese ethylenebisdithiocarbamate.

4. A process according to claim 1 in which the aqueous formaldehyde solution contains 30 to 40 grams of formaldehyde per 100 ml. of solution.

5. A stabilized, fungicidal manganese ethylenebisdithiocarbamate composition prepared by the process which comprises admixing aqueous formaldehyde solution with precipated manganese ethylenebisdithiocarbamate solids in aqueous medium obtained by reacting an aqueous solution of a water-soluble salt of ethylene bisdithiocarbamic acid with a water-soluble manganese salt, separating the formaldehyde-treated solids from the aqueous medium, washing the solids with water, and drying the solids.

6. A composition according to claim 5 wherein the proportion of formaldehyde admixed is within the range of 0.05 to 1 mole, calculated as 100% HCHO, per mole of manganese ethylenebisdithiocarbamate.

7. A composition according to claim 6 wherein the formaldehyde is from 0.25 to 0.5 mole per mole of manganese ethylenebisdithiocarbamate.

8. A composition according to claim 5 in which the aqueous formaldehyde solution contains 30 to 40 grams of formaldehyde per 100 ml. of solution.

* * * * *